(12) United States Patent
Vajo et al.

(10) Patent No.: US 10,033,030 B1
(45) Date of Patent: Jul. 24, 2018

(54) METHODS OF MAKING CATHODES FOR ALUMINUM BATTERIES

(71) Applicant: HRL Laboratories, LLC, Malibu, CA (US)

(72) Inventors: John J. Vajo, West Hills, CA (US); Adam F. Gross, Santa Monica, CA (US); Ping Liu, Irvine, CA (US); Jocelyn Hicks-Garner, Venice, CA (US); Elena Sherman, Culver City, CA (US); Sky Van Atta, Culver City, CA (US)

(73) Assignee: HRL Laboratories, LLC, Malibu, CA (US)

( * ) Notice: Subject to any disclaimer, the term of this patent is extended or adjusted under 35 U.S.C. 154(b) by 102 days.

(21) Appl. No.: 15/212,580

(22) Filed: Jul. 18, 2016

Related U.S. Application Data

(62) Division of application No. 14/167,654, filed on Jan. 29, 2014, now Pat. No. 9,425,455, which is a division of application No. 12/868,479, filed on Aug. 25, 2010, now Pat. No. 8,715,853.

(51) Int. Cl.
| | |
|---|---|
| *H01M 4/04* | (2006.01) |
| *H01M 10/39* | (2006.01) |
| *H01M 4/58* | (2010.01) |
| *H01M 4/80* | (2006.01) |

(52) U.S. Cl.
CPC ......... *H01M 4/044* (2013.01); *H01M 4/0404* (2013.01); *H01M 4/582* (2013.01); *H01M 4/80* (2013.01); *H01M 10/399* (2013.01)

(58) Field of Classification Search
CPC .... H01M 4/044; H01M 4/582; H01M 4/0404; H01M 4/80; H01M 10/399
See application file for complete search history.

(56) References Cited

U.S. PATENT DOCUMENTS

| | | | |
|---|---|---|---|
| 4,882,244 A | 11/1989 | Donahue et al. | |
| 6,316,142 B1 | 11/2001 | Delnick et al. | |
| 7,361,431 B2 | 4/2008 | Kim et al. | |
| 2001/0028979 A1 | 10/2001 | Takami | |
| 2010/0092865 A1* | 4/2010 | Kanno | C04B 41/009 |
| | | | 429/221 |

OTHER PUBLICATIONS

Donahue et al., "Secondary aluminum-iron (III) chloride batteries with a low temperature molten salt electrolyte," J. Applied Electrochemistry 22 (1992), 230-234, Chapman & Hall.
Li and Bjerrum, "Aluminum as anode for energy storage and conversion: a review," Journal of Power Sources 110 (2002), 1-10, Elsevier Science B.V.

\* cited by examiner

*Primary Examiner* — Jane Rhee
(74) *Attorney, Agent, or Firm* — O'Connor & Company

(57) ABSTRACT

Variations of the invention provide an improved aluminum battery consisting of an aluminum anode, a non-aqueous electrolyte, and a cathode comprising a metal oxide, a metal fluoride, a metal sulfide, or sulfur. The cathode can be fully reduced upon battery discharge via a multiple-electron reduction reaction. In some embodiments, the cathode materials are contained within the pore volume of a porous conductive carbon scaffold. Batteries provided by the invention have high active material specific energy densities and good cycling stabilities at a variety of operating temperatures.

14 Claims, 2 Drawing Sheets

METHODS OF MAKING CATHODES FOR ALUMINUM BATTERIES

PRIORITY DATA

This patent application is a divisional application of U.S. patent application Ser. No. 14/167,654, filed Jan. 29, 2014 (now allowed), which is a divisional application of U.S. Pat. No. 8,715,853, granted May 6, 2014, each of which is hereby incorporated by reference herein in its entirety.

FIELD OF THE INVENTION

The present invention generally relates to improved aluminum batteries and novel cathodes for aluminum batteries.

BACKGROUND OF THE INVENTION

Aluminum (Al) is an attractive anode material for energy storage and conversion. Its relatively low atomic weight of 26.98 along with its trivalence give an electrochemical equivalent of 2.98 Ah/g, compared with 3.86 Ah/g for lithium, 2.20 Ah/g for magnesium, and 0.82 Ah/g for zinc. From a volume standpoint, aluminum should yield a capacity per unit volume of 8.04 $Ah/cm^3$, compared with 2.06 $Ah/cm^3$ for lithium, 5.85 $Ah/cm^3$ for zinc, and 3.83 $Ah/cm^3$ for magnesium. Aluminum-based batteries, in principle, have better chemical stability in many electrolytes than do lithium-based batteries. Additionally, aluminum is an abundant and relatively inexpensive metal.

The state of the art includes many Al battery chemistries based on aqueous electrolytes (see, for example, Li and Bjerrum, "Aluminum as anode for energy storage and conversion: a review," *Journal of Power Sources*, vol. 110, pp. 1-10, 2002). However, for all aqueous electrolyte-based Al batteries, corrosion of the Al anode is a persistent problem. Corrosion of the anode reduces an Al battery's energy content and limits storage life. In addition, the corrosion products lead to passivating films that inhibit the battery reactions, thereby reducing the battery's power capabilities.

Due to the problems associated with aqueous electrolytes, it is beneficial to employ non-aqueous molten salt electrolytes in Al batteries. Compared with aqueous electrolytes, the advantages of molten salts are mainly three-fold: high electrical conductivity, fast electrode kinetics and hence less polarization, and high decomposition potential. Aluminum can be electrodeposited from non-aqueous media and therefore molten salt electrolytes are suitable for developing rechargeable aluminum batteries.

The state of the art includes Al batteries based on non-aqueous molten salt electrolytes that operate near room temperature (see, for example, Donahue et al., "Secondary aluminum-iron (III) chloride batteries with a low temperature molten salt electrolyte," *Journal of Applied Electrochemistry*, vol. 22, pp. 230-234, 1992). The cathodes of these batteries contain transition-metal chlorides, such as $FeCl_3$, which react according to one-electron reduction reactions (e.g., $FeCl_3 + e = FeCl_2 + Cl^-$). As a result of the atomic weight of chlorine and the stoichiometry of the one-electron reduction reaction, the theoretical active material specific energy density of these batteries is less than 350 Wh/kg. This theoretical energy content is too low for many applications.

In view of the current state of the art for Al batteries, there are several needs. First, Al batteries should effectively operate at or near room temperature. Second, to reduce or avoid corrosion, Al batteries containing non-aqueous electrolytes are preferred. Third, improved Al batteries preferably include a cathode that can be fully reduced upon battery discharge. Generally, there is a commercial desire for Al batteries with active material specific energy densities exceeding 400 Wh/kg.

SUMMARY OF THE INVENTION

The present invention addresses the aforementioned needs in the art, as will now be summarized and further described in detail below.

In some variations, the invention provides an aluminum battery comprising an aluminum-containing anode, a non-aqueous electrolyte, and a cathode, wherein the cathode comprises one or more cathode active materials selected from the group consisting of metal (M) oxides and metal (M) fluorides; and wherein the battery has a discharge state wherein the ratio of the number of Al atoms to the number of metal (M) atoms in the cathode is about 0.4 or greater.

In various embodiments, the ratio of the number of Al atoms to the number of metal (M) atoms in the cathode is about 0.6, 0.8, 1.0, 1.2, or greater.

The cathode active material may be one or more metal oxides selected from the group consisting of $CuO$, $P_2O_5$, $SnO_2$, $PbO_2$, $FeO$, $Fe_2O_3$, $CoO$, $Co_2O_3$, $NiO$, and $AgO$. Or, the cathode active material may be one or more metal fluorides selected from the group consisting of $CoF_2$, $CoF_3$, $FeF_2$, $FeF_3$, $CuF_2$, $MoF_5$, and $SnF_4$.

In some embodiments, the non-aqueous electrolyte is a mixture of aluminum chloride and an organic salt selected from the group consisting of n-butyl pyridinium chloride, 1-methyl-3-ethylimidazolium chloride, 1,2-dimethyl-3-propylimidazolium chloride, 1,4-dimethyl-1,2,4-triazolium chloride, and any combinations thereof.

Other variations of the invention provide an aluminum battery comprising an aluminum-containing anode, a non-aqueous electrolyte, and a cathode, the cathode comprising (a) one or more cathode active materials selected from the group consisting of a metal (M) oxide, a metal (M) fluoride, a metal (M) sulfide, and sulfur (represented here as M); and (b) a conductive material with pores having at least one dimension below about one micrometer, wherein the cathode active material is contained within the pores, wherein the battery has a discharge state wherein the ratio of the number of Al atoms to the number of M atoms in the cathode is about 0.4 or greater.

The ratio of the number of Al atoms to the number of M atoms in the cathode may be about 0.6, 0.8, 1.0, 1.2, or greater. In some embodiments, the conductive material includes a porous conductive scaffold, such as a porous conductive carbon scaffold.

In these variations, the cathode active material may be one or more metal oxides selected from the group consisting of $CuO$, $P_2O_5$, $SnO_2$, $PbO_2$, $FeO$, $Fe_2O_3$, $CoO$, $Co_2O_3$, $NiO$, and $AgO$. Or, the cathode active material may be one or more metal fluorides selected from the group consisting of $CoF_2$, $CoF_3$, $FeF_2$, $FeF_3$, $CuF_2$, $MoF_5$, and $SnF_4$. The cathode active material may be sulfur or a metal sulfide, such as $FeS_2$ or $NiS_2$.

Preferred aluminum batteries have an active material specific energy density in excess of 400 Wh/kg, such as 800 Wh/kg or higher.

The present invention additionally relates to novel cathodes. In some variations, a cathode for an aluminum battery comprises one or more cathode active materials selected from the group consisting of metal oxides and metal fluorides, wherein the cathode has a cathode discharge state wherein the ratio of the total number of discharged electrons to the number of cathode metal atoms is greater than 1.0.

In some embodiments, the ratio of the total number of discharged electrons to the number of cathode metal atoms is about 1.5, 2.0, 2.5, 3.0, or more.

The cathode active material may be one or more metal oxides selected from the group consisting of CuO, $P_2O_5$, $SnO_2$, $PbO_2$, FeO, $Fe_2O_3$, CoO, $Co_2O_3$, NiO, and AgO. Alternatively, the cathode active material may be one or more metal fluorides selected from the group consisting of $CoF_2$, $CoF_3$, $FeF_2$, $FeF_3$, $CuF_2$, $MoF_5$, and $SnF_4$.

In other variations, a cathode for an aluminum battery comprises (a) a cathode active material selected from the group consisting of a metal oxide, a metal fluoride, a metal sulfide, and sulfur; and (b) a conductive material with pores having at least one dimension below about one micrometer, wherein the cathode active material is contained within the pores, wherein the cathode has a cathode discharge state wherein the ratio of the total number of discharged electrons to the number of cathode metal atoms is greater than 1.0, 1.5, 2.0, 2.5, 3.0, or more.

The conductive material may include a porous conductive scaffold, such as a porous conductive carbon scaffold. The cathode active material may include one or more metal oxides, metal fluorides, metal sulfides, and/or sulfur.

Another variation of the invention provides a cathode precursor to a metal fluoride cathode for an aluminum battery, the cathode precursor comprising a conductive scaffold (such as a porous conductive carbon scaffold) with pores having at least one dimension below about one micrometer, and a precursor material contained in the pores, wherein the precursor material comprises one or more metals, in non-fluorinated form, selected from the group consisting of Fe, Co, Cu, Ni, Mo, and Sn.

In some embodiments of the cathode precursor, the precursor material comprises the metal as a metal chloride, a metal bromide, a metal iodide, a metal oxide, or a pure metal.

This invention also provides a method of constructing a cathode for an aluminum battery, the method comprising (a) receiving a conductive scaffold (e.g., a porous conductive carbon scaffold) with pores having at least one dimension below about one micrometer; (b) incorporating a precursor material into the pores; and (c) converting the precursor material, simultaneously with or subsequent to step (b), to a cathode active material selected from a metal oxide or a metal fluoride.

In some method embodiments, the precursor material is a hydrated metal nitrate salt and the converting step comprises infusion of one or more hydrated metal nitrate salts, followed by dehydration or thermal decomposition to produce a metal oxide cathode active material. In some embodiments, the precursor material is a metal alkoxy compound and the converting step comprises condensation of the metal alkoxy compound to produce a metal oxide cathode active material. The metal oxide may be selected from the group consisting of CuO, $P_2O_5$, $SnO_2$, $PbO_2$, FeO, $Fe_2O_3$, CoO, $Co_2O_3$, NiO, and AgO.

In other method embodiments, the precursor material is selected from the group consisting of a metal chloride, metal bromide and metal iodide, and the converting step comprises drying and fluorinating the precursor material to produce a metal fluoride cathode active material. In some embodiments, the precursor material is a metal oxide in an aerogel and the converting step comprises fluorinating the metal oxide to produce a metal fluoride cathode active material.

The fluorinating may be carried out with a fluorinating agent, such as xenon difluoride or fluorine gas. The metal fluoride is selected from the group consisting of $CoF_2$, $CoF_3$, $FeF_2$, $FeF_3$, $CuF_2$, $MoF_5$, and $SnF_4$, in some embodiments.

In certain embodiments, the method comprises incorporating a metal salt into the pores, converting the metal salt into a pure metal, and then heating the pure metal in the presence of xenon difluoride to produce a metal fluoride cathode active material.

Some methods further include constructing an aluminum battery including the cathode, an aluminum-containing anode, and a non-aqueous electrolyte. Optionally, some methods include discharging the battery, wherein the cathode is reduced upon battery discharge via a multiple-electron reduction reaction as described herein.

DETAILED DESCRIPTION OF EMBODIMENTS OF THE INVENTION

Figure 1:
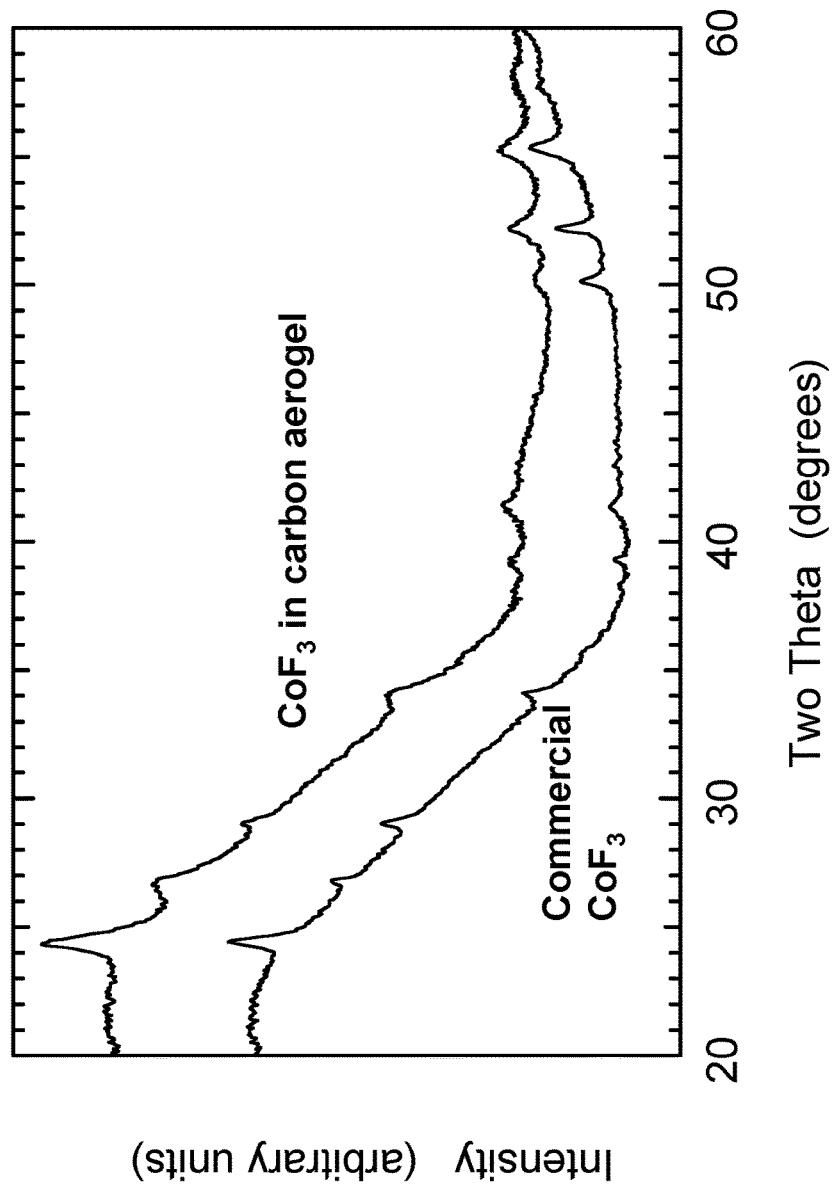
FIG. 1 shows a powder x-ray diffraction pattern for a commercial source of $CoF_3$ and a carbon aerogel containing $CoF_3$, in accordance with Example 1.

The batteries and methods of the present invention will now be described in detail by reference to various non-limiting embodiments.

Unless otherwise indicated, all numbers expressing dimensions, capacities, reaction stoichiometries, and so forth used in the specification and claims are to be understood as being modified in all instances by the term "about." Without limiting the application of the doctrine of equivalents to the scope of the claims, each numerical parameter should at least be construed in light of the number of significant digits and by applying ordinary rounding techniques.

As used herein and in the appended claims, the singular forms "a," "an," and "the" include the plural reference unless the context clearly dictates otherwise. Unless defined otherwise, all technical and scientific terms used herein have the same meanings as commonly understood by one of ordinary skill in the art to which this invention belongs. Preferred methods, techniques, devices, and materials are described, although any methods, techniques, devices, or materials similar or equivalent to those described herein may be used in the practice or testing of the present invention.

Some embodiments of the present invention will now be described in more detail, including reference to the accompanying figures. The figures provide representative illustration of the invention and are not limiting in their content. It will be understood by one of ordinary skill in the art that the scope of the invention extends beyond the specific embodiments depicted. This invention also incorporates routine experimentation and optimization that is within the skill of a person having ordinary skill in this art as of the effective filing date of this patent.

In some variations, this invention provides an aluminum (Al) battery comprising an Al metal anode, a non-aqueous electrolyte, and a cathode containing a metal oxide that is substantially reduced during discharge. In other variations, the invention provides an Al battery comprising an Al metal anode, a non-aqueous electrolyte, and a cathode containing a metal fluoride that is substantially reduced during discharge. In still other variations, the invention provides an Al battery comprising an Al metal anode, a non-aqueous electrolyte, and a cathode containing sulfur or a metal sulfide that is substantially reduced during discharge.

As used in the present context, a cathode that is "reduced" during discharge means that at least 20%, such as 30%, 40%, 50%, 60%, or more, of the cathode active material is converted stoichiometrically to its fully reduced state while aluminum atoms are discharged from the anode. By "substantially reduced" it is meant that at least 60% of the cathode active material is converted stoichiometrically to its fully reduced state. In some embodiments, at least 70%, 80%, 90%, 95%, or more (including the entirety) of the cathode active material is converted stoichiometrically to its fully reduced state. The portion, if any, of the cathode active material that is not fully reduced may be partially reduced, converted through side reactions to side products, chemically or physically combined with impurities or other materials present to inhibit full reduction, or simply unconverted.

In some variations, the invention provides an aluminum battery comprising an aluminum-containing anode, a non-aqueous electrolyte, and a cathode, wherein the cathode comprises one or more cathode active metals (M); and wherein the battery has a discharge state wherein the ratio of the number of Al atoms to the number of metal (M) atoms in the cathode is about 0.4 or greater. In various embodiments, the ratio of the number of Al atoms to the number of metal (M) atoms in the cathode is about 0.6, 0.8, 1.0, 1.2, or greater.

In some variations, a cathode for an aluminum battery comprises one or more cathode active metals, wherein the cathode has a cathode discharge state wherein the ratio of the total number of discharged electrons to the number of cathode metal atoms is greater than 1.0. In some embodiments, the ratio of the total number of discharged electrons to the number of cathode metal atoms is about 1.5, 2.0, 2.5, 3.0, or more.

A cathode that discharges more than one electron for each cathode metal atom can be described as carrying out a multiple-electron reduction reaction. By a "multiple-electron reduction reaction," it is meant an electrochemical reaction, or plurality of reactions or elementary reaction steps, wherein more than one mole of electrons per mole of active cathode metal is transferred from the anode to the cathode. Here, "active cathode metal" is on an elemental basis, e.g. for $Fe_2O_3$ as the cathode, the calculation is moles of electrons transferred per moles Fe undergoing reaction (or equivalently, electrons transferred per Fe atom).

The cathode is a metal oxide, metal fluoride, metal sulfide, or sulfur. Exemplary metal oxides for the cathode include $CuO$, $P_2O_5$, $SnO_2$, $PbO_2$, $FeO$, $Fe_2O_3$, $CoO$, $Co_2O_3$, $NiO$, and $AgO$. Exemplary metal fluorides for the cathode include $CoF_2$, $CoF_3$, $FeF_2$, $FeF_3$, $CuF_2$, $MoF_5$, and $SnF_4$. In some variations, the cathode material is sulfur (S) or a sulfur-containing metal compound (e.g., $FeS_2$, $NiS_2$, or $MoS_2$). Mixtures of any of the foregoing are possible, of course.

The Al anode may be constructed from pure Al, from Al containing various impurities, or from Al alloys. To increase the battery efficiency, it is preferred that the aluminum purity be at least about 99 wt %, such as 99.5 wt %, 99.85 wt %, 99.99 wt %, or 99.995 wt %. Pure Al reduces parasitic corrosion and gives increased coulombic efficiency, but higher Al purity translates to higher cost.

Aluminum may contain impurities including heavy transition elements such as iron, copper, zinc, lead, and nickel. These impurities create galvanic cells on the aluminum anode which tends to produce local reduction which, in turn, reduces coulombic efficiency.

The Al anode may contain one or more Al alloys, in various embodiments. Al alloys are metal solutions in which Al is the predominant metal. Some exemplary alloying elements are copper, zinc, tin, calcium, manganese, silicon, and magnesium. Many Al alloys are known commercially, including but not limited to Alclad, Birmabright, Duralumin, Magnalium, Magnox, and Silumin. In some embodiments, Al alloys incorporate Sn to create higher galvanic currents. In some embodiments, Al alloys incorporate Ca and/or Mg to permit the use of lower-grade Al for the anode.

The Aluminum Association, pursuant to ANSI H35 standards, publishes specifications describing the composition, mechanical properties, and nomenclature of aluminum alloys (see http://www.aluminum.org, which contents available on the filing date herewith are hereby incorporated by reference). Any of these published Al alloys may be used in embodiments of the invention.

The Al anode may be constructed using known designs and procedures. Exemplary Al anode configurations include, but are by no means limited to, aluminum cylinders, spheres, chips, pellets, foils, plates, and the like, formed to selected dimensions suitable for battery construction.

The non-aqueous electrolyte may be chosen from a variety of well-known room-temperature molten salt electrolyte systems based on mixtures of organic salts with a suitable solvent. Exemplary organic salts include, but are not limited to, n-butyl pyridinium chloride (BuPyCl), 1-methyl-3-ethylimidazolium chloride (MEICl), 1,2-dimethyl-3-propylimidazolium chloride (DMPIC), 1,4-dimethyl-1,2,4-triazolium chloride (DMTC), and any combinations thereof.

In some preferred embodiments, the solvent for the organic salt(s) is aluminum chloride, $AlCl_3$. Aluminum chloride is a powerful Lewis acid and forms $[AlCl_4]^-$ ions in the presence of chloride ions. When organic salts are mixed with less than 50 mol % $AlCl_3$, the major ionic species are $[AlCl_4]^-$ and and the melt is considered basic. With higher than 50 mol % $AlCl_3$, the major ionic species in the mixture is $[Al_2O_7]^-$ and the melt is considered acidic. At 50 mol % $AlCl_3$, the equimolar melt is neutral (Li and Bjerrum, "Aluminum as anode for energy storage and conversion: a review," *Journal of Power Sources*, vol. 110, pp. 1-10, 2002).

Other solvents for organic salts include, for example, aluminum fluoride, aluminum bromide, and aluminum iodide. In some embodiments, non-aqueous electrolytes are include a solvent selected from the group consisting of dimethyl sulfoxide, sulfolane, ethylene carbonate, propylene carbonate, dimethyl carbonate, diethyl carbonate, methyl ethyl carbonate, 1,2-dimethoxyethane, 1,2-diethoxyethane, γ-buterolactone, γ-valerolactone, 1,3-dioxolane, tetrahydrofuran, 2-methyltetrahydrofuran, acetonitrile, proprionitrile, diglyme, triglyme, methyl formate, trimethyl phosphate, triethyl phosphate, and mixtures thereof.

When CuO (copper(II) oxide, also known as cupric oxide) is employed in some embodiments of the Al battery of the invention, the cathode carries out the following overall battery reaction:

$$2Al+3CuO=Al_2O_3+3Cu$$

This reaction has a voltage of 2.1 V, an active material energy density of 1135 Wh/kg, and a composite capacity of 550 mAh/g, based on tabulated thermodynamic quantities. The composite capacity is based on the combined weight of Al+CuO.

When $P_2O_5$ (phosphorus pentoxide) is employed in some embodiments, the cathode carries out the following overall Al battery reaction:

$$3.33Al + P_2O_5 = 1.67Al_2O_3 + 2P$$

This reaction has a voltage of 1.3 V, an active material energy density of 1530 Wh/kg, and a composite capacity of 1160 mAh/g, based on tabulated thermodynamic quantities.

When $SnO_2$ (tin(IV) oxide, also known as stannous oxide) is employed in some embodiments, the cathode carries out the following overall Al battery reaction:

$$2Al + 1.5SnO_2 = Al_2O_3 + 1.5Sn$$

This reaction has a voltage of 1.4 V, an active material energy density of 800 Wh/kg, and a composite capacity of 575 mAh/g, based on tabulated thermodynamic quantities. This reaction may involve lower-valence intermediates such as SnO.

When $PbO_2$ (lead(IV) oxide, also known as lead dioxide) is employed in some embodiments, the cathode carries out the following overall Al battery reaction:

$$2Al + 1.5PbO_2 = Al_2O_3 + 1.5Pb$$

This reaction has a voltage of 2.2 V, an active material energy density of 850 Wh/kg, and a composite capacity of 388 mAh/g, based on tabulated thermodynamic quantities. This reaction may involve lower-valence intermediates such as PbO.

When $Fe_2O_3$ (iron(III) oxide, also known as ferric oxide) is employed in some embodiments, the cathode carries out the following overall Al battery reaction:

$$2Al + Fe_2O_3 = Al_2O_3 + 2Fe$$

This reaction has a voltage of 1.45 V, an active material energy density of 1090 Wh/kg, and a composite capacity of 750 mAh/g, based on tabulated thermodynamic quantities. This reaction may involve lower-valence intermediates such as $Fe_3O_4$ and FeO.

When NiO (nickel(II) oxide) is employed in some embodiments of the invention, the cathode carries out the following overall Al battery reaction:

$$2Al + 3NiO = Al_2O_3 + 3Ni$$

This reaction has a voltage of 1.6 V, an active material energy density of 945 Wh/kg, and a composite capacity of 580 mAh/g, based on tabulated thermodynamic quantities.

When AgO (silver(I,III) oxide, also known as silver peroxide) is employed in some embodiments, the cathode carries out the following overall Al battery reaction:

$$2Al + 3AgO = Al_2O_3 + 3Ag$$

Silver(I,III) oxide has an empirical formula AgO with two different coordination environments. One coordination environment includes two collinear oxide neighbors, while the other coordination environment includes four coplanar oxide neighbors. AgO can therefore be formulated as $Ag_2O—Ag_2O_3$. This Al battery reaction has a voltage of 2.8 V, an active material energy density of 1060 Wh/kg, and a composite capacity of 375 mAh/g, based on tabulated thermodynamic quantities.

When $CoF_3$ (cobalt(III) fluoride) is employed in some embodiments, the cathode carries out the following overall Al battery reaction:

$$Al + CoF_3 = AlF_3 + Co$$

This reaction has a voltage of 2.45 V, an active material energy density of 1380 Wh/kg, and a composite capacity of 560 mAh/g, based on tabulated thermodynamic quantities. This reaction may involve lower-valence intermediates such as $CoF_2$.

When $FeF_3$ (iron(III) fluoride, also known as ferric fluoride) is employed in some embodiments, including as described in Example 2, the cathode carries out the following overall Al battery reaction:

$$Al + FeF_3 = AlF_3 + Fe$$

This reaction has a voltage of 1.75 V, an active material energy density of 1000 Wh/kg, and a composite capacity of 575 mAh/g, based on tabulated thermodynamic quantities. This reaction may involve lower-valence intermediates such as $FeF_2$.

When $CuF_2$ (copper(II) fluoride, also known as cupric fluoride) is employed in some embodiments of the invention, the cathode carries out the following overall Al battery reaction:

$$Al + 1.5CuF_2 = AlF_3 + 1.5Cu$$

This reaction has a voltage of 2.4 V, an active material energy density of 1075 Wh/kg, and a composite capacity of 450 mAh/g, based on tabulated thermodynamic quantities.

When $MoF_5$ (molybdenum(V) fluoride) is employed in some embodiments of the invention, the cathode carries out the following overall Al battery reaction:

$$5/3Al + MoF_5 = 5/3AlF_3 + Mo$$

This reaction has a voltage of 2.3 V, an active material energy density of 1325 Wh/kg, and a composite capacity of 565 mAh/g, based on tabulated thermodynamic quantities. This reaction may involve lower-valence intermediates such as $MoF_4$, $MoF_3$, and $MoF_2$.

When $SnF_4$ (tin(IV) fluoride) is employed in some embodiments of the invention, the cathode carries out the following overall Al battery reaction:

$$4/3Al + SnF_4 = 4/3AlF_3 + Sn$$

This reaction has a voltage of 2.2 V, an active material energy density of 1015 Wh/kg, and a composite capacity of 465 mAh/g, based on tabulated thermodynamic quantities. This reaction may involve lower-valence intermediates such as $SnF_2$.

With sulfur as the cathode active material, the overall Al battery reaction may be written as:

$$2Al + 3S = Al_2S_3$$

This reaction has a voltage of 1.1 V, an active material energy density of 1180 Wh/kg, and a composite capacity of 1010 mAh/g, based on tabulated thermodynamic quantities.

When $FeS_2$ (iron(II) disulfide, also known as ferrous disulfide) is employed in some embodiments, the cathode carries out the following overall Al battery reaction:

$$2Al + 1.5FeS_2 = Al_2S_3 + 1.5Fe$$

This reaction has a voltage of 0.67 V, an active material energy density of 475 Wh/kg, and a composite capacity of 690 mAh/g, based on tabulated thermodynamic quantities.

When $NiS_2$ (nickel(II) disulfide) is employed in some embodiments, the cathode carries out the following overall Al battery reaction:

$$2Al + 1.5NiS_2 = Al_2S_3 + 1.5Ni$$

This reaction has a voltage of 0.78 V, an active material energy density of 525 Wh/kg, and a composite capacity of 680 mAh/g, based on tabulated thermodynamic quantities.

The cathode materials may be formulated into cathode electrodes using methods known to those skilled in the art.

Cathode electrodes can be formed from finely divided particulate materials, the particles of which must be bonded together to form cohesive structures. This function of bonding materials together is conventionally accomplished by the use of monomers, polymers, copolymers, or mixtures thereof, collectively referred to as binders.

In some embodiments, the methods of the invention include mixing the metal oxide, fluoride, or sulfide (or sulfur) with conductive carbon, polymeric binders, and a solvent to form inks or slurries that may be cast, thereby forming electrodes. The active cathode material is typically present in an amount from about 75 wt % to 98 wt % based on the total solids content of the cathode slurry or ink. The slurry formed may be drawn, shaped, and/or kneaded to the desired consistency.

For example, as recited in U.S. Pat. No. 6,316,142, a cathode slurry or ink is formulated as a mixture comprising a solution of a polymeric binder material dissolved in a solvent into which a solid active cathode material and a conductive additive have been dispersed. The components forming the slurry can be mixed together using means known to persons skilled in the art.

Binders should be insoluble in the electrolyte and chemically inert with respect to the other materials battery. The binders should not be oxidized or reduced within the battery, and the binders should be thermally stable during storage and over the operating temperature range. The binder should also have sufficient mechanical integrity and flexibility to bond the appropriate materials and to prevent cracking, spalling, exfoliation, and other forms of mechanical disintegration caused by thermal expansion/contraction or by the expansion/contraction which accompanies the charge/discharge cycling of the battery.

Exemplary binders include, but are not limited to, poly (vinylidene fluoride-co-hexafluoropropylene), polytetrafluoroethylene, polyethylene, and ethylene-chlorotrifluoroethylene copolymer. In some embodiments, fluorinated homopolymers such as polyvinylidene fluoride may be dissolved in a solvent such as N-methyl pyrrolidone and then blended into a slurry with the active cathode material and a carbon-based conductive additive.

The solvent for preparing the ink or slurry is not particularly limited. In some embodiments, the solvent is 1-methyl-2-pyrrolidinone or a chemically similar compound. The solvent is generally removed from the cathode slurry or ink by evaporation using a heating means, such as a convective oven or an infrared (IR) energy source. The temperature and duration of the solvent-removal process will depend on the specific solvent that is used in the ink formulation.

To reduce the viscosity of the slurry and achieve desirable application properties, it may be desirable to also employ a solvent diluent. The diluent may be employed to reduce the viscosity of the slurry, or to increase or decrease the vapor pressure of the ink, causing the ink to evaporate faster or slower. The diluent may also serve as a wetting agent to help the ink to flow on the substrate to which it is applied. Suitable diluents include, for example, various esters such as methyl formate or methyl acetate and alcohols such as ethanol or glycerol.

The conductive additive is typically a carbon or graphite. Suitable conductive additives include, for example, conductive carbons, graphites, activated carbon fibers, non-activated carbon nanofibers, metal flakes, metal powders, metal fibers, carbon fabrics, metal mesh, and electrically conductive polymers. The specific additives may be selected to increase the electrical conductivity of the composite or to adjust the thixotropy of the slurry for the coating or printing process. The conductive additive is typically present in an amount of from about 1 wt % to 15 wt %, based on the total solids content of the cathode slurry or ink.

In addition to these methods, the cathode materials may be mechanically milled at high impact energy and high shear energy to reduce the particle size of the cathode material to below 1 micrometer. The milling may optionally be performed with conductive carbon to improve the contact between the cathode material and the conductive carbon.

In some embodiments of the invention, the cathode materials may be incorporated into the pore volume of porous conductive scaffolds (such as carbon scaffolds) with small pores. An active battery material is introduced and then contained in the nanopores of the scaffold, which acts as a template to determine the dimensions of the active material as it is formed in the scaffold.

Incorporation of cathode materials into the pore volume of porous carbon scaffold may be accomplished using any known technique including melt infusion, solution infusion, or vapor infusion.

The cathode material may be incorporated into the pores directly. Alternatively, a precursor may be incorporated with simultaneous or subsequent conversion of the precursor into the cathode material. For example, metal oxides may be formed within porous scaffolds by melt infusion of hydrated metal nitrate salts. After infusion, the salts can be successively dehydrated and decomposed, yielding metal oxides, by heating to progressively higher temperatures. Alternatively, metal oxides may be formed by condensation of metal alkoxy compounds.

Metal fluorides may be incorporated, for example, by infusion of a solution of a metal chloride (e.g., iron chloride) followed by vacuum drying and conversion to metal fluorides with a fluorinating agent such as $F_2$ gas or $XeF_2$. Alternatively, metal bromide or metal iodide may be introduced, followed by conversion to metal fluorides with a fluorinating agent. Or, a metal oxide-filled aerogel may be employed to convert the metal oxide to a metal fluoride using a fluorinating agent.

Some embodiments of the invention provide a metal fluoride cathode precursor for an aluminum battery, the metal fluoride cathode precursor comprising a conductive scaffold with pores having at least one dimension below about one micrometer, wherein the pores contain a precursor material with a selected metal such as Fe, Co, Cu, Ni, Mo, and Sn. The precursor metal may be present as chlorides, bromides, iodines, oxides, or some other suitable form.

In certain embodiments, a metal salt is first incorporated into pores. The metal salt may be, for example, a metal nitrate, metal chloride, or metal sulfate. Then, at least some of the metal salt is converted to a pure metal, such as by heating under reducing conditions (e.g., a gas phase comprising hydrogen). The pure metal is then heated in the presence of xenon difluoride to produce a metal fluoride. An exemplary overall reaction of a metal M with xenon difluoride $XeF_2$ is as follows:

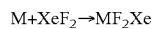

$$M + XeF_2 \rightarrow MF_2 Xe$$

The metal fluoride $MF_2$ can be, for example, $CoF_2$, $FeF_2$, or $CuF_2$. Depending on the oxidation state of the metal M, other reaction stoichiometries are possible, with a molar ratio of $XeF_2$ to M different than one.

A variety of scaffold materials are possible. For example, electrically conductive scaffold materials include, but are not limited to, carbon aerogels, mesoporous carbons, activated carbons, carbon nanofoams, carbon xerogels, carbon nanotubes, and carbon nanotube/nanofiber assemblies. In other embodiments, electrically conductive scaffold materials include ruthenium oxide aerogels, indium tin oxide aerogels, antimony tin oxide aerogels, and carbon-silica composite aerogels. Preferred scaffold materials possess an electrical conductivity selected from about $10^{-3}$ S m$^{-1}$ to about $10^3$ S m$^{-1}$. The scaffold preferably includes electrically conducting pathways to the active battery nanoparticles that are dispersed in three dimensions.

Incorporation of cathode materials into the pores of carbon conductive scaffolds is taught in U.S. patent application Ser. No. 12/476,258 to Gross et al., filed Jun. 2, 2009, and is incorporated by reference herein for all purposes.

In some embodiments, carbon aerogels are employed. Carbon aerogels are composed of particles with sizes in the nanometer range, covalently bonded together. They have very high porosity (over 50%, with pore diameter generally less than 100 nm) and surface areas ranging typically between 400-2000 m$^2$/g. When solvent removal occurs under supercritical conditions, in some embodiments, the aerogel network does not shrink and a highly porous, low-density material can be produced.

In some embodiments of the scaffold, carbon xerogels are employed. A xerogel is a solid formed from a gel by drying with unhindered shrinkage. Xerogels usually retain high porosity (e.g., 25%) and surface area (e.g., 150-900 m$^2$/g), along with very small pore size (1-10 nm).

The scaffold material includes "pores" (e.g., nanopores and/or nanovoids) having at least one length dimension below about 1 μm (1000 nm). In some embodiments, at least one length dimension is selected from about 0.5-100 nm, about 1-50 nm, or about 5-25 nm. Dimensions of about 10 nm or less can be preferred for battery chemical reactions that are mass-transfer limited. The average pore size of the conductive scaffold along with the pore-size distribution can be synthetically adjusted, as will be recognized by a skilled artisan.

When the pore is a nanopore or nanotube, the length dimension can be the diameter or the length of the nanopore or nanotube, for example. When the pore is an approximately spherical nanovoid, the length dimension can be the diameter of the nanovoid. Nominal or average diameters can also be used, such as when the pore is a tortuous channel having irregular diameter. For an arbitrary nanovoid, the length dimension can be calculated as an effective diameter that is the one-third root of the apparent nanovoid volume.

A pore should be large enough to contain a selected oxide, fluoride, or sulfur/sulfide material. Otherwise, the invention shall not be limited by a minimum length scale except in accordance with fundamental properties associated with the particular materials chosen (e.g., their molecular sizes). It is theoretically possible to employ pore dimensions even smaller than 0.5 nm, but practically speaking, pore dimensions of about one nanometer can be desirable.

The scaffold material may include various regular or irregular morphologies, including lamellar, hexagonal, cubic, and so on. Various amounts of crystallinity may be present, in addition to amorphous content. Some scaffold materials have an interconnected three-dimensional network structure with a high specific surface area, such as 100, 200, 300, 400, 500 m$^2$/g or higher.

The amount of scaffold material, relative to the amount of active battery material, may vary widely. In various embodiments, the scaffold material may be present in an amount of about 10 wt % to about 90 wt % of the combined weight of the active battery material plus scaffold material. Preferably, the scaffold material is present in an amount less than about 70 wt %, more preferably less than about 50 wt %, and most preferably less than about 30 wt %.

Particles of the porous conductive scaffold (e.g., porous conductive carbon) may be formulated into cathode electrodes using known methods, or the methods described above.

Current collectors collect electrical current generated and provide an efficient surface for attachment of the electrical contacts leading to the external circuit. Current collectors may be made from any suitable materials, such as (but not limited to) Al, Cu, Ni, or C. The current collectors may also be fabricated from alloys, such as stainless steel. Physically, the current collectors may be thin foils, metal meshes, metal nets, perforated metal, metallized plastic films, metal grids, expanded metal grids, metal wools, woven fabrics, woven meshes, non-woven meshes, or felts.

In some variations, the invention provides an Al battery packaged into either prismatic format cells or cylindrical cells. In the prismatic format, the stacked structure is preferably sealed with a packaging material capable of preventing air and water contamination of the battery.

Al batteries of the invention can provide active material energy densities of about 400 Wh/kg to about 2000 Wh/kg or higher, such as about 500-1500 Wh/kg or about 1000-1300 Wh/kg.

Preferably, Al batteries of the invention are suitable for operation at or near room temperature. A typical operating range is about from −30° C. to 60° C. Preferably, Al batteries of the invention are relatively stable with less than 20% loss in capacity over 1000 charge/discharge cycles.

The relatively high energy content and long life of Al batteries in accordance with this invention provides utility in a variety of commercial applications. For example, these Al batteries can be used in portable consumer-electronic devices, low-signature power for military applications, and electric-vehicle transportation technologies, to name a few uses.

Example 1

In this Example 1, CoF$_3$ is incorporated into a nanostructure scaffold consisting of carbon aerogel with a peak in the pore-size distribution at 42 nm.

Carbon aerogel cubes (0.860 g) are placed in a flask and dried under vacuum while being heated to 300° C. for one hour. The aerogel is then cooled, backfilled with Ar, and kept in a sealed flask. Then 5.00 g of CoCl$_2$.6H$_2$O (Aldrich Chemical, 98 wt % purity) is placed in a glass vial and heated to 110° C. until melted. The aerogel is then removed from the flask and dropped into the molten CoCl$_2$.6H$_2$O. The vial containing the aerogel+CoCl$_2$.6H$_2$O mixture is sealed and placed back into a 110° C. oven for one hour to cause the cobalt chloride to wick into the aerogel pore volume by capillary force.

Next, the vial is removed from the oven and the CoCl$_2$.6H$_2$O-filled aerogel cubes are removed from the vial and placed in a Schlenk flask. The flask is first placed in an ice bath to solidify the CoCl$_2$.6H$_2$O and then vacuum is applied to dehydrate the CoCl$_2$.6H$_2$O. The ice bath is removed and the flask is heated to 150° C. while still under vacuum to fully dehydrate the cobalt chloride. The sample is brought into an Ar-filled water-free (<1 ppm) and oxygen-free (<1 ppm) glove box and the sides of the cubes are scraped to remove bulk CoCl$_2$.

The sample is analyzed with XRD and found to contain CoCl$_2$. Gravimetric analysis indicates that the CoCl$_2$/aerogel composite is 41.8 wt % CoCl$_2$. Next, 0.229 g of XeF$_2$ (Alfa Aesar, 99.5%) is placed in the bottom of a Teflon®-lined Parr acid-digestion bomb in a glove box. Then 0.140 g of the $CoCl_2$/aerogel composite is placed in a small Teflon beaker in the bomb, which is sealed and heated to 80° C. for 20 hours.

After this treatment, the sample is brought back into the glove box and a $CoF_3$/aerogel composite is obtained. There is an optional step of placing the fluorinated $CoCl_2$/aerogel composite in a Schlenk flask, heating it under vacuum at 100° C. for two hours to remove any residual $XeF_2$ absorbed in the aerogel, and then bringing it back into the glove box.

Elemental analysis (Desert Analytics) indicates atomic ratios of 1 Co:4.1 F:0.3 Cl. Powder x-ray diffraction, shown in FIG. 1, matches that for commercial $CoF_3$. FIG. 1 confirms that broadening of the diffraction peaks for the aerogel sample originates from substantial confinement of $CoF_3$ to the small aerogel pores.

Example 2

An Al/$FeF_3$ cell is constructed in a beaker using an Al foil anode. The electrolyte consists of 1-methyl-3-ethylimidazolium chloride (Aldrich, ≥95%) and $AlCl_3$ (Aldrich, anhydrous, sublimed) in a 45:55 molar ratio. The cathode is formed by mechanically milling $FeF_3$ (Aldrich, 98%) and carbon black (MMM Super P) at a 80/20 weight ratio in a Fritsch P6 planetary mill (80 $cm^3$ hardened-steel milling vessel, 1.1 gram total sample weight, 30 Cr steel milling balls 7 mm in diameter, 400 rpm, 1 hour).

0.25 grams of this mixture are then mixed with 0.05 grams of TIMREX® KS6 graphite (Timcal AG) and 0.033 grams of poly(vinylidene fluoride-co-hexafluoropropylene) binder (Kynar Flex 2801) in 0.6 grams of 1-methyl-2-pyrrolidinone (NMP) to render a homogeneous slurry. The slurry is cast on carbon paper (Toray paper) and placed under an IR lamp for 2 hours to remove NMP solvent. Prior to coating, the carbon paper is sonicated in 0.5 M $H_2SO_4$ for 10 minutes to improve the adhesion of the $FeF_3$ slurry. Electrode disks with an area of 0.71 $cm^2$ are cut out and dried at 100° C. under vacuum for 15 hours.

Figure 2:
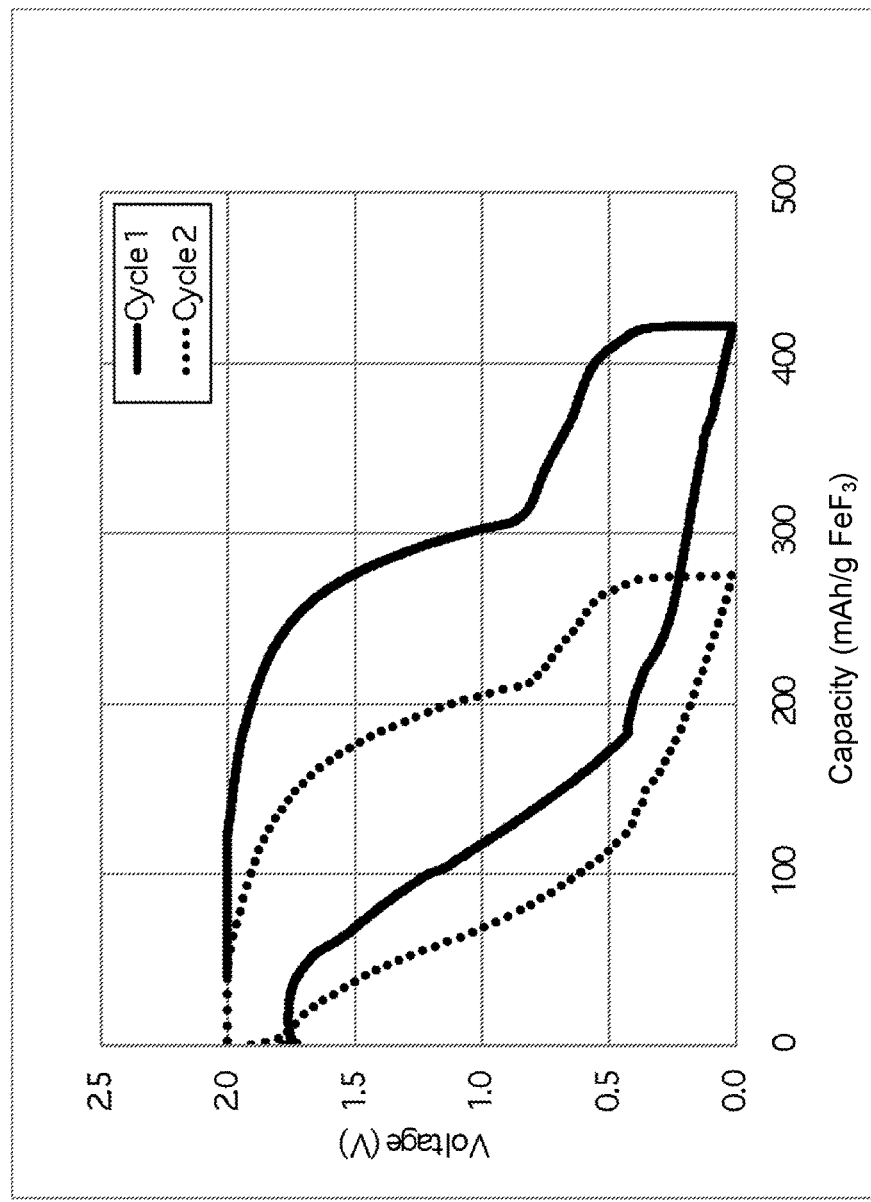
FIG. 2 depicts cycling performance of an $Al/FeF_3$ cell at a current density of 70 mA/g $FeF_3$, demonstrating a multiple-electron reduction reaction according to Example 2.

The Al/$FeF_3$ cell accomplishes the multiple-electron reduction reaction, Al+$FeF_3$=$AlF_3$+Fe, for two cycles. Cycling is performed at room temperature in an argon-purged glove box. FIG. 2 shows first and second cycle constant-current discharge/recharge curves, at a current density of 70 mA/g $FeF_3$ (which corresponds to about a C/10 rate, assuming a theoretical capacity of 700 mAh/g).

In this detailed description, reference has been made to multiple embodiments of the invention. These embodiments are described in sufficient detail to enable those skilled in the art to practice the invention, and it is to be understood that modifications to the various disclosed embodiments may be made by a skilled artisan.

Where methods and steps described above indicate certain events occurring in certain order, those of ordinary skill in the art will recognize that the ordering of certain steps may be modified and that such modifications are in accordance with the variations of the invention. Additionally, certain steps may be performed concurrently in a parallel process when possible, as well as performed sequentially.

All publications, patents, and patent applications cited in this specification are herein incorporated by reference in their entirety as if each publication, patent, or patent application were specifically and individually put forth herein.

The embodiments, variations, and figures described above should provide an indication of the utility and versatility of the present invention. Other embodiments that do not provide all of the features and advantages set forth herein may also be utilized, without departing from the spirit and scope of the present invention. Such modifications and variations are considered to be within the scope of the invention defined by the claims.

What is claimed is:

1. A method of constructing a cathode for an aluminum battery, said method comprising:
    (a) receiving a porous conductive carbon scaffold with pores having at least one dimension below about one micrometer;
    (b) incorporating a precursor material into said pores; and
    (c) converting said precursor material, simultaneously with or subsequent to step (b), to a cathode active material selected from a metal oxide or a metal fluoride.

2. The method of claim 1, wherein said precursor material is a hydrated metal nitrate salt and said converting step comprises infusion of one or more hydrated metal nitrate salts, followed by dehydration or thermal decomposition to produce a metal oxide cathode active material.

3. The method of claim 2, wherein said metal oxide is selected from the group consisting of CuO, $P_2O_5$, $SnO_2$, $PbO_2$, FeO, $Fe_2O_3$, CoO, $Co_2O_3$, NiO, and AgO.

4. The method of claim 1, wherein said precursor material is a metal alkoxy compound and said converting step comprises condensation of said metal alkoxy compound to produce a metal oxide cathode active material.

5. The method of claim 4, wherein said metal oxide is selected from the group consisting of CuO, $P_2O_5$, $SnO_2$, $PbO_2$, FeO, $Fe_2O_3$, CoO, $Co_2O_3$, NiO, and AgO.

6. The method of claim 1, wherein said precursor material is selected from the group consisting of a metal chloride, metal bromide and metal iodide, and said converting step comprises drying and fluorinating said precursor material to produce a metal fluoride cathode active material.

7. The method of claim 6, wherein said fluorinating is carried out with a fluorinating agent selected from xenon difluoride or fluorine gas.

8. The method of claim 6, wherein said metal fluoride is selected from the group consisting of $CoF_2$, $CoF_3$, $FeF_2$, $FeF_3$, $CuF_2$, $MoF_5$, and $SnF_4$.

9. The method of claim 1, wherein said precursor material is a metal oxide in an aerogel and said converting step comprises fluorinating said metal oxide to produce a metal fluoride cathode active material.

10. The method of claim 9, wherein said fluorinating is carried out with a fluorinating agent selected from xenon difluoride or fluorine gas.

11. The method of claim 9, wherein said metal fluoride is selected from the group consisting of $CoF_2$, $CoF_3$, $FeF_2$, $FeF_3$, $CuF_2$, $MoF_5$, and $SnF_4$.

12. The method of claim 1, said method comprising incorporating a metal salt into said pores, converting said metal salt into a pure metal, and then heating said pure metal in the presence of xenon difluoride to produce a metal fluoride cathode active material.

13. The method of claim 1, further comprising constructing an aluminum battery including said cathode, an aluminum-containing anode, and a non-aqueous electrolyte.

14. The method of claim 13, further comprising discharging said battery, wherein said cathode is reduced upon battery discharge via a multiple-electron reduction reaction.

* * * * *